United States Patent [19]

Fabish

[11] 4,020,863

[45] May 3, 1977

[54] FLUID PRESSURE REGULATOR CONSTRUCTION

[75] Inventor: Donald C. Fabish, Anaheim, Calif.

[73] Assignee: Robertshaw Controls Company, Richmond, Va.

[22] Filed: Oct. 9, 1975

[21] Appl. No.: 621,062

[52] U.S. Cl. .......................... 137/116.5; 137/505.25
[51] Int. Cl.² ......................................... G05D 16/10
[58] Field of Search ...... 137/116.5, 505.11, 505.25

[56] References Cited

UNITED STATES PATENTS

| 310,605 | 1/1885 | Millner | 137/505.11 |
| 2,675,649 | 4/1954 | Trevaskis | 137/505.25 |
| 3,658,082 | 4/1972 | DiTirro | 137/116.5 |

Primary Examiner—Robert G. Nilson
Attorney, Agent, or Firm—Candor, Candor & Tassone

[57] ABSTRACT

A housing is provided with a fluid pressure supply inlet and a reduced fluid pressure outlet separated by a valve seat that is controlled by a valve member having a piston head subjected to intermediate fluid pressure intermediate the valve seat and the outlet so as to cause movement of the valve member relative to the valve seat in relation to the intermediate fluid pressure to tend to regulate the intermediate fluid pressure to a predetermined amount with the housing having a relief valve unit for relieving excess intermediate fluid pressure, the piston head itself including the relief valve unit for relieving the excess intermediate fluid pressure acting thereon.

10 Claims, 4 Drawing Figures

FLUID PRESSURE REGULATOR CONSTRUCTION

This invention relates to an improved fluid pressure regulator construction.

It is well known that a fluid pressure regulator construction can be provided and have a housing provided with a fluid pressure supply inlet and a reduced fluid pressure outlet separated by a valve seat that is controlled by a valve member having a piston head subjected to intermediate fluid pressure intermediate the valve seat and the outlet so as to cause movement of the valve member relative to the valve seat in relation to the intermediate fluid pressure to tend to regulate the intermediate fluid pressure to a predetermined amount with the housing also having relief valve means for relieving excess intermediate fluid pressure. For example, such a fluid pressure regulator construction is disclosed in the U.S. Pat. No. to Fallon 3,848,631.

It is a feature of this invention to provide an improved pressure regulator construction of the above type wherein the relief valve means is uniquely arranged.

In particular, one embodiment of this invention provides a fluid pressure regulator construction having a housing means provided with a fluid pressure supply inlet and a reduced fluid pressure outlet separated by a valve seat that is controlled by a valve member having a piston head subjected to intermediate fluid pressure intermediate the valve seat and the outlet so as to cause movement of the valve member relative to the valve seat in relation to the intermediate fluid pressure to tend to regulate the intermediate fluid pressure to a predetermined amount with the housing means having relief valve means for relieving excess intermediate fluid pressure, the piston head itself including the relief valve means for relieving the excess intermediate fluid pressure acting thereon.

In this manner, a more effective relief valve seat area is provided for rapid pressure relief while a simplified construction is utilized as only one extra part with a seat is required to accomplish the pressure relief operation. Thus, machining and threading of external ports is eliminated and with proper selection of areas and spring forces, the relief valve means of this invention can be utilized in an upstream or downstream relief valve arrangement.

Accordingly, it is an object of this invention to provide an improved pressure regulator construction having one or more of the novel features set forth above or hereinafter shown or described.

Other objects, uses and advantages of this invention are apparent from a reading of this description which proceeds which reference to the accompanying drawings forming a part thereof and wherein.

Figure 1:
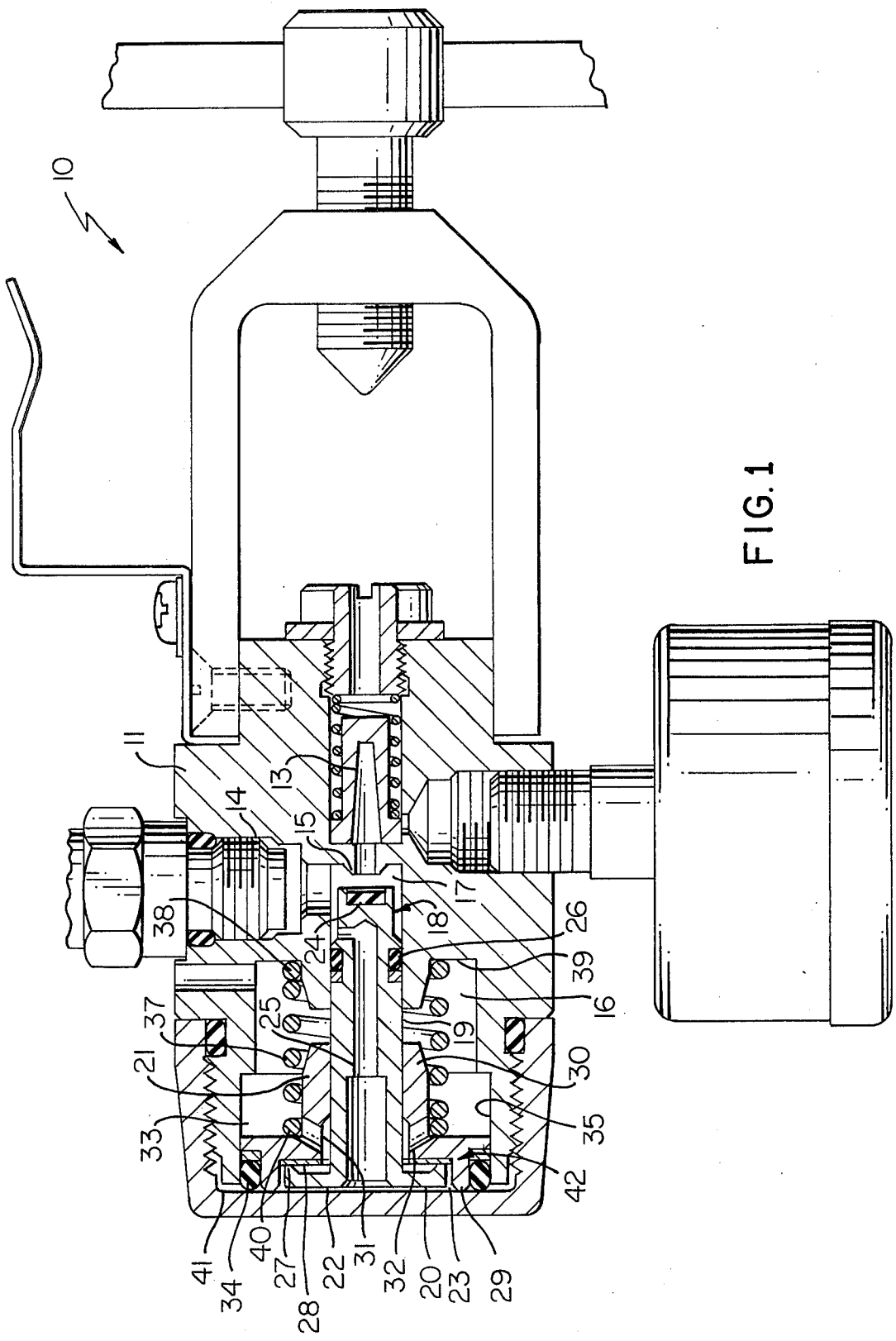
FIG. 1 is a cross-sectional view illustrating the improved fluid pressure regulator construction of this invention.

While the various features of this invention are hereinafter described and illustrated as being particularly adapted for regulating gas pressure, it is to be understood that the various features of this invention can be utilized singly or in any combination thereof to provide a pressure regulator construction for any desired fluid.

Therefore this invention is not to be limited to only the embodiment illustrated in the drawings, because the drawings are merely utilized to illustrate one of the wide variety of uses of this invention.

Referring now to FIG. 1, the improved fluid pressure regulator construction of this invention is generally indicated by the reference numeral 10 and comprises a housing means 11 having an inlet 12 (schematically illustrated in FIGS. 2 and 3) adapted to be interconnected to a fluid pressure supply in a conventional manner and leading to a fluid pressure supply chamber 13 of the housing means 11 that is separated from a reduced fluid pressure outlet 14 of the housing means 11 by a valve seat 15.

A chamber 16 is formed in the housing means 11 and has a part 17 thereof adjacent the valve seat 15 on the down-stream side thereof and is therefore intermediate the valve seat 15 and the outlet 14, the intermediate part 17 of the chamber 16 having a movable valve member 18 disposed therein for controlling the valve seat 15 in a manner hereinafter set forth.

The valve member 18 is interconnected by a piston rod part 19 to an enlarged piston head 20 that cooperates with a movable relief valve seat member 21 in a manner hereinafter described to define a piston head surface means 22 that is adapted to be subjected to intermediate fluid pressure in a portion 23 of the chamber 16 in a manner hereinafter described.

Figure 2:
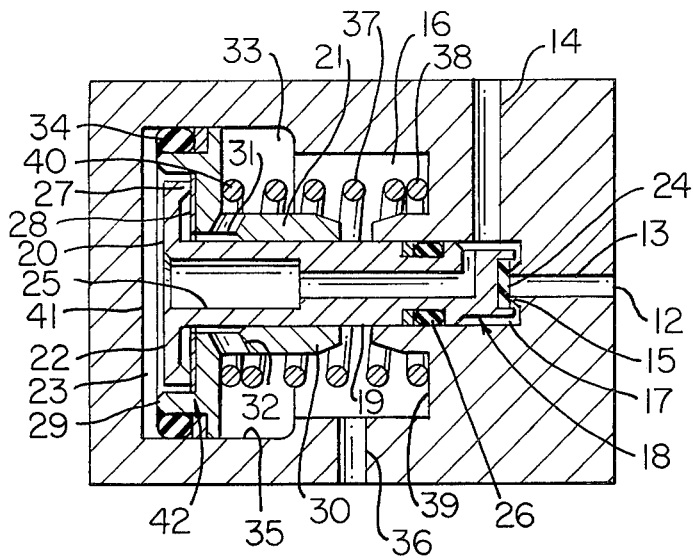
FIG. 2 is a schematic view similar to FIG. 1 and illustrates the pressure regulator construction in an operating condition thereof different from the operating condition illustrated in FIG. 1.
Figure 3:
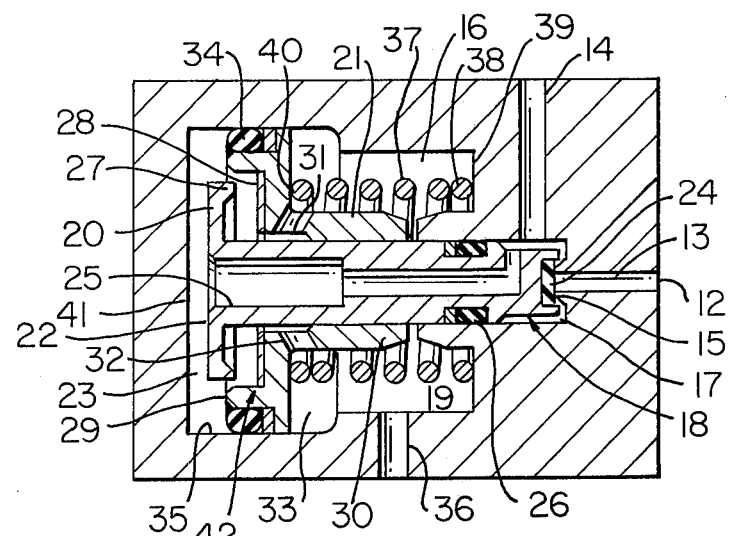
FIG. 3 is a view similar to FIG. 2 and illustrates the fluid pressure regulator construction of this invention in a condition for relieving excess fluid pressure.
Figure 4:
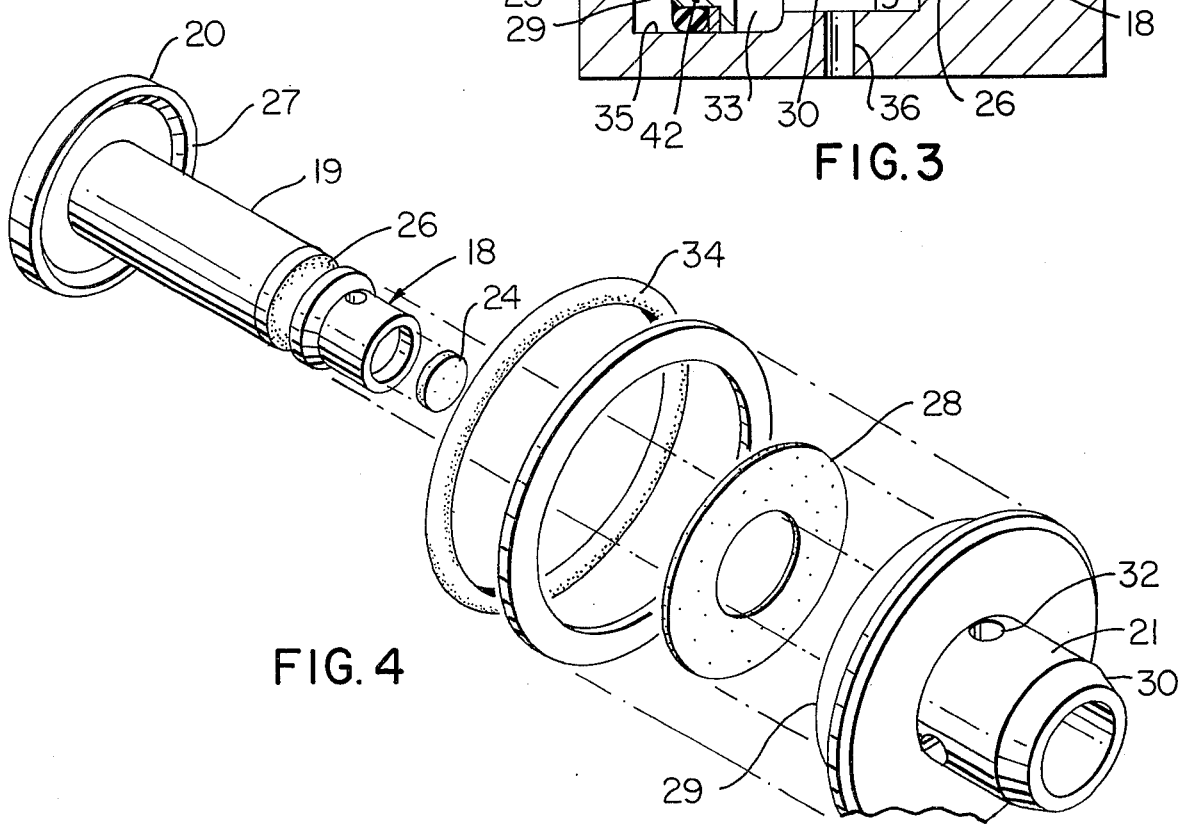
FIG. 4 is an exploded perspective view illustrating certain parts of the fluid pressure regulator construction of this invention.

The valve member 18 includes a resilient disc 24 for sealing closed the valve seat 15 when the valve member 18 is disposed against the same in the manner illustrated in FIGS. 2 and 3.

The piston head 20 and piston rod portion 19 have a passage 25 extending therethrough and always interconnecting the intermediate portion 17 of the chamber 16 with the portion 23 of the chamber 16 so that fluid pressure intermediate the valve seat 15 and outlet 14 is adapted to be directed by the passage 25 to the portion 23 of the chamber 16 for the purpose hereinafter described.

The piston rod part 19 of the valve member 18 is sealingly and slidingly disposed in the intermediate portion 17 of the chamber 16 such as by an O-ring arrangement 26 as illustrated in the drawings.

The relief valve seat member 21 cooperates with a part 27 of the piston head 20 in such a manner that the part 27 comprises a relief valve member for engaging against a relief valve seat 28 of the relief valve seat member 21 to close the same in the the manner illustrated in FIG. 1 so that the portion 29 of the relief valve seat member 21 outboard of the part 27 of the piston head 20, in effect, forms part of the piston head surface means 22 that is exposed to thefluid pressure in the portion 23 of the chamber 16 which tends to force the piston head 20 and, thus, the valve member 18 toward the main vlave seat 15 as will be apparent hereinafter.

The relief valve seat member 21 includes a tubular portion 30 that is telescopically disposed about the piston rod 19 while being slideable relative thereto, the portion 30 having an offset part 31 adjacent the piston rod 19 to cooperate with the valve seat 28 and thereby be adapted to fluidly communicate the valve seat 28 to branch passages 32 that pass through the tubular part 30 of the relief valve member 21 and are in fluid communication with a middle portion 33 of the chamber 16.

The middle portion 33 of the chamber 16 is fluid-sealed from the portion 17 of the chamber 16 by the sealing means 26 of the piston rod 19 while the chamber portion 33 is normally fluid-sealed from the chamber portion 23 by a resilient O-ring arrangement 34 carried by the relief valve seat member 21 and disposed in sliding and sealing engagement with the internal wall 35 of the housing means 11 as illustrated.

However, the chamber portion 33 is adapted to be fluidly interconnected to the chamber portion 23 through the valve seat 28 of the relief valve seat member 21 when the valve seat 28 is in an open condition as illustrated in FIG. 3 for a purpose hereinafter described.

The chamber portion 33 of the housing means 11 is adapted to be interconnected to an exhaust outlet 36 of the housing means 11 for exhausting excess fluid pressure from the intermediate chamber portion 17 as will be apparent hereinafter.

A single compression spring 37 is disposed in the chamber 16 and has one end 38 bearing against a chamber wall 39 of the housing means 11 while the other end 40 thereof bears against the relief valve seat member 21 to tend to urge the same away from the main valve seat 15 in the manner illustrated in FIG. 1 whereby the relief valve seat member 21 is urged against an end wall 41 of the housing means 11 by the spring 37 and carries the valve member 18 therewith as the valve seat 28 is engaging against the valve member part 27 of the piston head 20 to move the same to the position illustrated in FIG. 1 whereby the valve member 18 is disposed fully open from the main valve seat 15 for a purpose hereinafter described.

Thus, it can be seen that the relief valve seat member 21 and relief valve member 27 of the piston head 20 cooperate together to form a relief valve means that is generally indicated by the reference numeral 42 in the drawings and which functions in a manner hereinafter described.

Thus, it can be seen that the pressure regulator construction 10 of this invention can be formed from a plurality of simply formed and simply assembled parts to operate in a manner now to be described.

Assuming that the inlet 12 of the housing means 11 is interconnected to a fluid pressure supply source, such as a supply source having a gas pressure of 200 to 4500 psig, and the outlet 14 is interconnected to a fluid pressure operated device that is to receive a lower pressure, such as a gas pressure of 40 to 90 psig, the compression spring 37 and size of the piston head 20 and relief valve member 21 have been so chosen that the same will cause the pressure regulator construction 10 to reduce the supply pressure and maintain the same at a predetermined reduced pressure, such as some selected pressure in the range of 40 to 90 psig, in the intermediate chamber portion 17 in a manner now to be described.

With supply pressure now entering through the valve seat 15 with the valve member 18 in the open condition illustrated in FIG. 1, the fluid pressure now entering the chamber 17 also flows through the passage 25 to the chamber portion 23 to act against the surface means 22 and 29 of the piston head 20 and relief valve seat member 21 to tent to move the piston head 20 and relief valve seat member 21 in unison toward the valve seat 15 in opposition to the force of the compression spring 37. When the pressure in the intermediate chamber 17 reaches a pressure sufficient to act on the surface means 22 and 29 of the piston head 20 and relief valve seat member 21 to collapse the spring 37 so that the valve member 18 is moved against the valve seat 15, the pressure in the intermediate chamber 17 is at the predetermined pressure which is desired for operating the device that is interconnected to the outlet 14 of the pressure regulator construction 10. Should the pressure in the intermediate chamber portion 17 fall below the predetermined pressure, the force of the compression spring 37 again overcomes the force of the pressure in the chamber portion 23 to move the piston head 20 and relief valve seat member 21 away from the valve seat 15 to open the same to permit more supply pressure to enter the chamber 17 and raise the pressure in the intermediate chamber 17 to the predetermined pressure at which time the valve member 18 again closes the valve seat 15.

Thus, under normal conditions, the valve member 18 is moved relative to the valve seat 15 by the action of the compression spring 37 and the force of the fluid pressure in the intermediate chamber 17 acting against the piston head surface means 22 and 29 in the manner previously described to tend to maintain the fluid pressure in the intermediate chamber portion 17 at the predetermined pressure of the pressure regulator construction 10 whereby the relief valve seat member 21, in effect, form part of the piston head 20 in its cooperation therewith.

However, if an adverse condition should exist, such as either the valve member 18 and/or valve seat 15 becoming defective so that the pressure in the intermediate chamber portion 17 exceeds the predetermined pressure even though the valve member 18 is fully disposed against the valve seat 15 in the manner illustrated in FIG. 2, the excess pressure building up in the intermediate chamber portion 17 is also acting in the chamber portion 23 and since the piston rod head 20 can no longer move toward the valve seat as the valve member 18 is disposed against the valve seat 15 as illustrated in FIG. 2, the excess pressure in the chamber portion 23 acts on the relief valve seat member 21 and moves the same toward the valve seat 15 in opposition to the force of the compression spring 37 in the manner illustrated in FIG. 3 so that the relief valve seat 28 is moved away from the relief valve member 27 to open the chamber 23 and, thus, the intermediate chamber portion 17, to the vent or exhaust 36 through the passage 32 of the relief valve seat member 21 and middle chamber portion 33 whereby the excess pressure is rapidly dumped. Thus, the pressure in the intermediate chamber 17 can return to the predetermined pressure whereby the compression spring 37 will again move the relief valve seat member 21 to close the relief valve means 42 in the manner illustrated in FIG. 2.

Therefore, it can be seen that the relief valve means 42 prevents excessive pressure from building up in the intermediate chamber portion 17 and cooperates with the piston head 20 during normal conditions to operate the pressure regulator construction 10 in a manner to tend to maintain a predetermined pressure in the intermediate chamber portion 17 in the manner previously described.

Thus, it can be seen that the improved pressure regulator construction of this invention eliminates any need for an externally mounted relief valve and thereby creates a neater outward appearance and permits the unit 10 to be mounted in existing bores for other pressure regulator constructions that do not contain pressure relief valve units.

Also, the relief valve means 42 of this invention provides a large effective area for rapid relief since the same surrounds the piston head 20 as previously described.

While a piston-type relief valve seat member 21 has been illustrated and described, it is to be understood that the same could be a diaphragm or bellows unit to cooperate with the piston head 20 in the manner previously described.

Thus, it can be seen that this invention provides an improved pressure regulator construction.

While the form of this invention now preferred has been described and illustrated as required by the Patent Statute, it is to be understood that other forms can be utilized and still fall within the scope of the appended claims.

What is claimed is:

1. In a fluid pressure regulator construction having a housing means provided with a fluid pressure supply inlet and a reduced fluid pressure outlet separated by a main valve seat that is controlled by a main valve member having a piston head secured thereto to move in unison therewith in all operating conditions of said regulator construction and be subjected to intermediate fluid pressure intermediate said valve seat and said outlet so as to cause movement of said main valve member in a direction along the longitudinal axis of said piston head relative to said main valve seat in relation to said intermediate fluid pressure to tend to regulate said intermediate fluid pressure to a predetermined amount, with such housing means having relief valve means for relieving excess intermediate fluid pressure, the improvement wherein said piston head includes said relief valve means for relieving said excess intermediate fluid pressure acting thereon, said relief valve means comprising a relief valve seat substantially concentric with said longitudinal axis.

2. In a fluid pressure regulator construction as set forth in claim 1, said housing means carrying a compression spring that acts on said piston head to tend to move said main valve member to an open condition thereof.

3. In a fluid pressure regulator construction as set forth in claim 2, said spring also acting on said pressure relief valve means to tend to maintain the same in a closed condition thereof.

4. In a fluid pressure regulator construction as set forth in claim 1, said piston head having a surface means against which said intermediate fluid pressure acts to tend to cause movement of said main valve member relative to said main valve seat.

5. In a fluid pressure regulator construction having a housing means provided with a fluid pressure supply inlet and a reduced fluid pressure outlet separated by a main valve seat this is controlled by a main valve member having a piston head interconnected thereto to move in unison therewith and be subjected to intermediate fluid pressure intermediate said valve seat and said outlet so as to cause movement of said main valve member in a direction along the longitudinal axis of said piston head relative to said main valve seat in relation to said intermediate fluid pressure to tend to regulate said intermediate fluid pressure to a predetermined amount, with said housing means having relief valve means for relieving excess intermediate fluid pressure, the improvement wherein said piston head includes said relief valve means for relieving said excess intermediate fluid pressure acting thereon, said relief valve means comprising a relief valve seat substantially concentric with said longitudinal axis of said piston head and a relief valve member also substantially concentric with said longitudinal axis, said piston head having a surface means against which said intermediate fluid pressure acts to tend to cause movement of said main valve member relative to said main valve seat, said relief valve seat being movably carried by said piston head, said relief valve member forming part of said piston head, said relief valve seat normally forming part of said surface means of said piston head when said relief valve seat is held against said relief valve member.

6. In a fluid pressure regulator construction as set forth in claim 5, said relief valve seat being telescopically disposed on said piston head and being movable relative thereto.

7. In a fluid pressure regulator construction as set forth in claim 6, said housing carrying a compression spring that acts on said relief valve seat to tend to move said relief valve seat against said relief valve member.

8. In a fluid pressure regulator construction as set forth in claim 7, said spring also acting to tend to move said piston head away from said main valve seat whereby said spring operates both said relief valve seat and said main valve member.

9. In a fluid pressure regulator construction as set forth in claim 8, said housing having a chamber, said relief valve seat being sealingly and slidably disposed in said chamber.

10. In a fluid pressure regulator construction as set forth in claim 9, said piston head being interconnected to its said main valve member by a piston rod, said relief valve member of said piston head being telescopically disposed about said piston rod and facing toward said main valve seat.

* * * * *